United States Patent
Khosla et al.

(10) Patent No.: US 8,762,851 B1
(45) Date of Patent: Jun. 24, 2014

(54) GRAPHICAL USER INTERFACE FOR CREATING CONTENT FOR A VOICE-USER INTERFACE

(75) Inventors: Askok Mitter Khosla, Palo Alto, CA (US); Steven Samuel Pollock, Los Altos, CA (US)

(73) Assignee: West Interactive Corporation II, Omaha, NE (US)

( * ) Notice: Subject to any disclaimer, the term of this patent is extended or adjusted under 35 U.S.C. 154(b) by 331 days.

(21) Appl. No.: 12/955,216

(22) Filed: Nov. 29, 2010

Related U.S. Application Data

(63) Continuation of application No. 12/122,618, filed on May 16, 2008, now Pat. No. 7,861,170, which is a continuation of application No. 10/391,145, filed on Mar. 17, 2003, now Pat. No. 7,395,505.

(51) Int. Cl.
*G06F 3/0481* (2013.01)

(52) U.S. Cl.
USPC .......................... 715/727; 715/764; 715/833

(58) Field of Classification Search
CPC ................................. G06F 3/00; G06F 3/048

USPC .......................... 715/727, 772, 786, 833, 764
See application file for complete search history.

(56) References Cited

U.S. PATENT DOCUMENTS

| | | | |
|---|---|---|---|
| 5,887,073 A * | 3/1999 | Fazzari et al. | 382/110 |
| 6,567,805 B1 * | 5/2003 | Johnson et al. | 707/740 |
| 6,895,084 B1 * | 5/2005 | Saylor et al. | 379/88.22 |
| 7,117,450 B1 * | 10/2006 | Chaudhri | 715/787 |
| 2003/0051214 A1 * | 3/2003 | Graham et al. | 715/512 |
| 2003/0080990 A1 * | 5/2003 | Lyness | 345/713 |

* cited by examiner

*Primary Examiner* — Omar Abdul-Ali
*Assistant Examiner* — Phuong Nguyen

(57) ABSTRACT

In one embodiment, the invention provides a method for creating a voice application, the method being implemented by a computer system and comprising generating a graphical user interface comprising a text-to-topic button; receiving first input identifying a location of a text file; receiving second input selecting the text-to-topic button; partitioning content associated with the text file into subjects in response to receiving the second input; and storing information on the partitioning.

19 Claims, 23 Drawing Sheets

| Tutorial | | |
|---|---|---|
| # | Topic ID | |
| 1 | | IVTutorial |
| 2 | Title | Tutorial Topic Groups |
| 3 | Type | System |
| 4 | | Navigation Topics |
| 5 | NT Auction Types | Auction formats |
| 6 | NTBidding | Bidding |
| 7 | NTBuying | About buying |
| 8 | NTDutchAuction | Dutch auctions |
| 9 | NTFeedback | Feedback topics |
| 10 | NTMainMenu | Main menu |
| 11 | NTPayment | Payment |
| 12 | NTRegistration | Registration |
| 13 | NTSelling | About selling |
| 14 | | *Subject Topics* |
| 15 | | *Standard System Topics* |
| 16 | | *Standard Concept Memory Topics* |
| 17 | | *Standard Field Topics* |

Topic Title

Topic Name → STBidTips ← 18

| # | Tutorial Command | | |
|---|---|---|---|
| | | | Topic Title |
| 1 | )) | SIBidTips | |
| 2 | Title | Type on Bidding | |
| 3 | Type | 'Subject' | |
| 4 | Essence | Bidding tips | |
| 5 | Subjects | | |
| 6 | <Task | | First, a piece of advice: Don't bid if you don't intend to pay. You might just have to. |
| 7 | <Task | | Alright, bidding tips. Try not to bid in the first days of an auction. You might encourage others to bid, causing the price to rise. Instead, wait until the auction is near its close. Then bid the maximum amount you're willing to pay, regardless of any previous bids. This strategy is called striping and is perfectly legal. |
| 8 | ○ Confirm | To learn more about striping, say "Yes". | |
| 9 | ○ Agree | Yes | |
| 10 | Play Topic | | |
| 11 | ○ Agree | No | |
| 12 | <Task | | Next tip: Factor in shipping costs, which are usually paid by the buyer. You don't want to end up paying more than you bargained for. There are websites that compare shipping costs on different carriers, including the postal service. Or else email the seller with you zip code for a shipping estimate. |
| 13 | <Task | | Try adding a penny or two to your bid. This little extra something can mean the difference between winning by a nose and falling short. |
| 14 | <Task | | Use your My Page to track and manage your bids. |
| 15 | <Guidance | | Certain fraudulent bidding strategies like shilling and bid shielding are not allowed. |
| 16 | Ask | | For more information, say "shilling" or "bid shielding." |
| 17 | ○ Reply | Shilling | |
| 18 | Jump | STshilling | |
| 19 | ○ Reply | shielding | |
| 20 | Jump | STshielding | |

Tags ↗ ← Prompts

| Operation | Grammar Example | Visual Example | Style operation |
|---|---|---|---|
| Required | stop | stop | bold |
| Optional | stop ?and ?go | stop and go | italic |
| And | (stop and go) | stop and go | underline |
| Or | stop ?[(and go) now] | stop (and go, now) | comma separate and parenthesize |

| Subject | Topic | Glossary | Spoken Options |
|---|---|---|---|
| windows | stwindows | windows ?desktop ?computer | windows desktop<br>windows desktop computer,<br>windows<br>windows computer |
| desktop computer | STDesktop | ?[windows\|mac]desktop computer | desktop computer<br>windows desktop computer<br>mac desktop computer |

GRAPHICAL USER INTERFACE FOR CREATING CONTENT FOR A VOICE-USER INTERFACE

CROSS REFERENCE TO RELATED APPLICATIONS

The present application is a continuation of and claims priority from U.S. patent application Ser. No. 12/122,618, filed May 16, 2008, titled GRAPHICAL USER INTERFACE FOR CREATING CONTENT FOR A VOICE-USER INTERFACE, which, in turn, is a continuation of and claims priority from U.S. patent application Ser. No. 10/391,145, filed Mar. 17, 2003, and titled GRAPHICAL USER INTERFACE FOR CREATING CONTENT FOR A VOICE-USER INTERFACE, now issued as U.S. Pat. No. 7,395,505. The applicants hereunder claim the benefit of the filing dates of these applications to the fullest extent permitted by the United States Patent Laws, and these applications are incorporated herein by this reference in their entireties.

FIELD OF THE INVENTION

This invention relates to voice applications. In particular it relates to a method and system for building a voice application.

BACKGROUND

Voice applications are becoming increasingly popular and may be used in diverse applications such as computer support applications, interactive menu systems, information processing systems, such airline timetable, etc.

In order to create a voice application, it is necessary to create content for the voice application and to develop code which uses the content to generate a voice-user interface.

In order to ensure that the voice-user interface is able to interact with a caller and to engage in a question-and-answer style interaction that the caller perceives as a conversation with a human, the content and the code for the voice application has to be carefully thought out and should be able to cater for every possible eventuality during the interaction.

Thus, situations where the caller provides no input, or provides a meaningless response to choices that were presented to the caller, etc. have to be dealt with appropriately.

On account of the foregoing, it will be appreciated that the creation of a robust voice application, i.e., one that is capable of interacting with a user so that the user perceives the interaction as a conversation with a human, is a complex task that requires the question-and-answer style interaction to be carefully scripted and the code to be rigorous enough to ensure that the voice application is capable of handling all possible input from the caller.

Thus, a considerable amount of time and resources are required to create such robust voice applications. Consequently, a tool that facilitates the creation of robust voice applications is required, particularly where large bodies of knowledge are required to be made accessible to callers through the voice application.

BRIEF DESCRIPTION OF THE DRAWINGS

FIGS. 1 to 12, 14, 15, 17(a), 17(b), and 18 to 21 show various views of the graphical user interface in accordance with embodiments of the invention;

FIG. 13 shows a table which illustrates a shorthand representation of the grammar for a voice application in accordance with one embodiment of the invention;

FIG. 16 shows a table which contains an example for which a system in accordance with embodiments of the present invention will generate an alert message.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Aspects of the present invention disclose a method and a system for generating a graphical user interface to facilitate the creation of a voice application. FIGS. 1 to 12, 14, 15, 17(a), 17(b), and 18 to 21 of the drawings provide various views of a graphical user interface in accordance with one embodiment of the invention.

Figure 1:
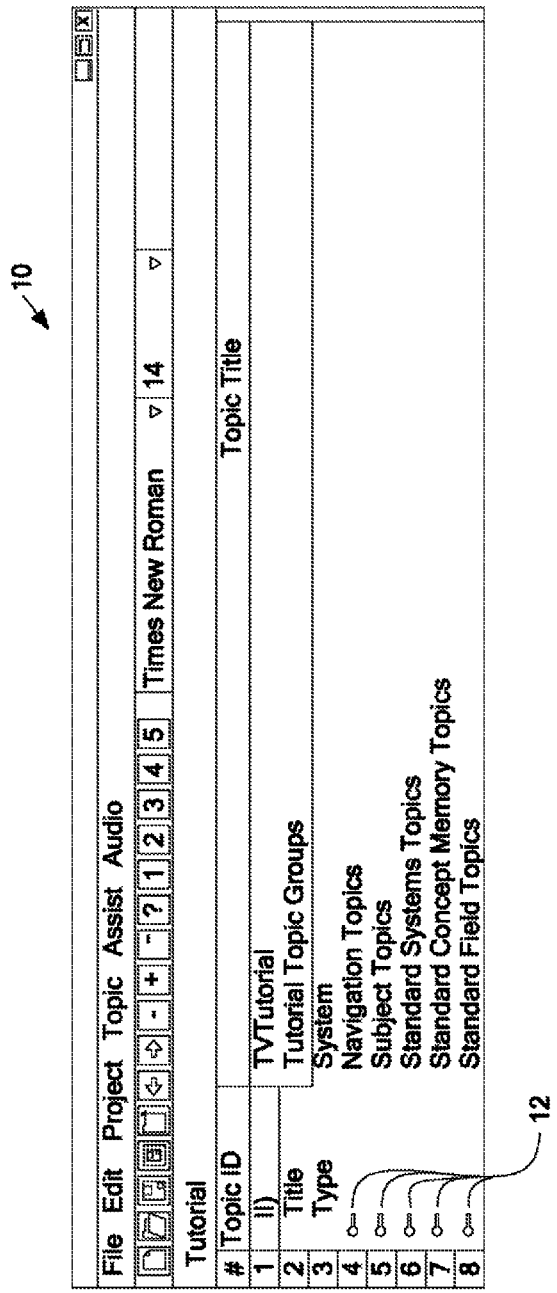

Referring to FIG. 1 of the drawings, reference numeral 10 generally indicates a view of the graphical user interface in which topics associated with content for a speech application is shown by topic grouping. For example, the view 12 shows the topic groupings to include navigation topics, subject topics, standard system topics, standard concept memory topics and standard field topics. These topics are discussed in co-pending U.S. patent application Ser. No. 10/319,144 entitled, "Automatic Generation of Voice Content for a Voice Response System" which is hereby incorporated by reference. In the view shown in FIG. 1 of the drawings, the actual topics within each topic groupings are hidden. However, any of the icons 12 may be selected by a user, e.g., using a pointing device such as a mouse, to expand the view 12 to show the actual topics within a topic group.

FIG. 2 of the drawings shows a view 14 of the graphical user interface in which the icon 12 associated with the group "navigation topics" was selected, resulting in the view 10 changing to the view 16, wherein, the actual topics within the navigation topic groupings are shown.

Referring now FIG. 3 of the drawings, reference numeral 16 shows a view of the graphical user interface which is conveniently referred to as an "editor view." As will be seen, the editor view 16 provides a command area 18 within which predefined tags used to structure content into a conversation are displayed. The predefined tags may be automatically generated using a "text-to-topic" tool as will be described below. In another embodiment, the predefined tags may be selected by a user, for example from a drop-down list. In yet another embodiment, the tags may be generated by converting a visual flowchart (described in electronic form) with predefined shapes and connectors. The view 16 also provides the actual text associated with each tag. For example, it will be seen that on line 6, the text "First, a piece of advice. Don't bid if you don't intend to pay. You might just have to." is associated with a "task" tag. By selecting one of the icons 12, the child tags of a parent tag may be hidden from view. A discussion of child and parent tags is contained in co-pending U.S. patent application Ser. No. 10/319,144.

Figure 4:
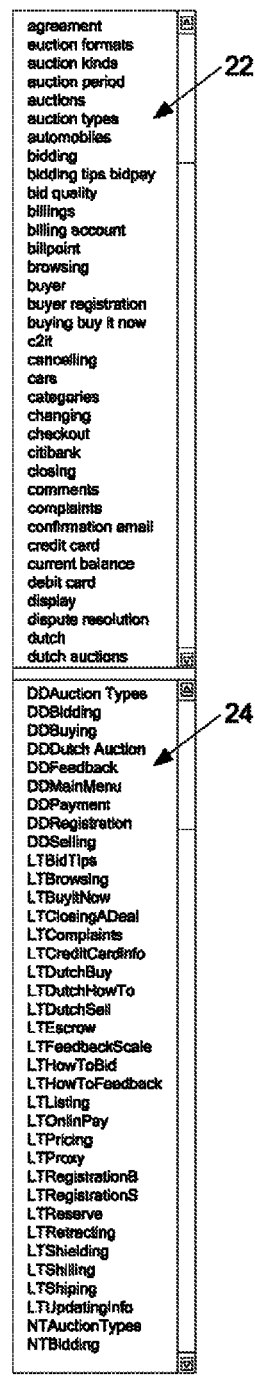

The view 16 also provides a button 20 which when selected by a user provides a subject listing 22 and a topic listing 24 (see FIG. 4 of the drawings). Entries within the subject listing 22 and the topic listing 24 may then be selected by a user. The system responds to the selection by displaying details of the selected subject or topic.

In one embodiment, the graphical user interface allows the user to enter a file name for a text file containing natural language text which the user wishes to use as raw content for the voice application. Thus, in this embodiment, the graphical user interface has a "text to topic button" which when selected causes the system to respond by analyzing the content of the specified text file and to partition the content into subjects and structure the content associated with each subject into a pseudo-conversation with appropriate questions and answers. Information on the partitioned subjects and the pseudo-conversation is then stored by the system. Tags defined in a markup language may be used to structure the content into the pseudo-conversation. Techniques for partitioning the content into subjects and generating the pseudo conversation are described in co-pending U.S. patent application Ser. No. 10/319,144.

Figure 5:
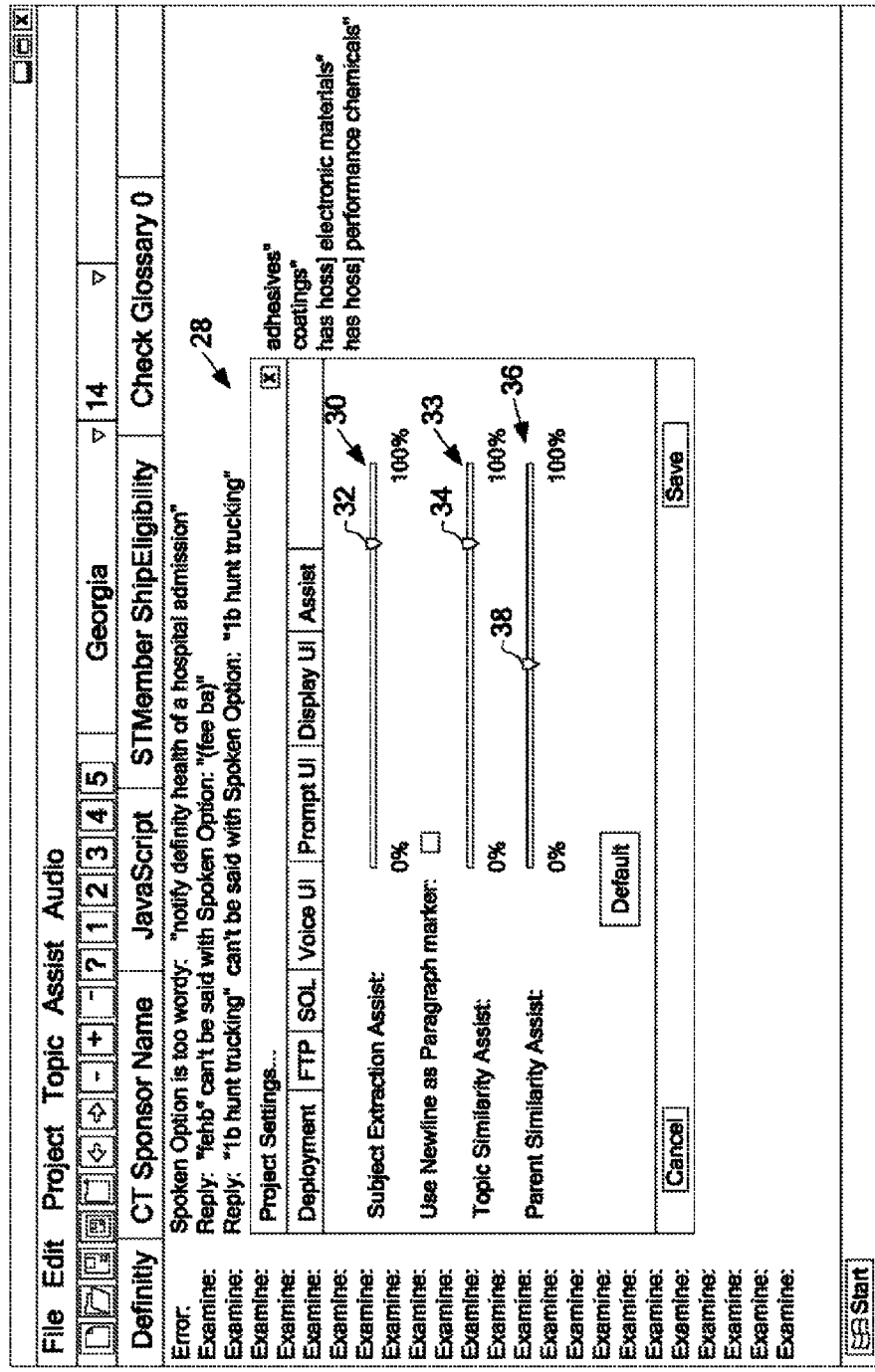

FIG. 5 of the drawings shows a view 26 of the graphical user interface immediately after the text to topic button has been selected. As will be seen, the view 26 includes a pop-up window 28 wherein various parameters that control the granularity of the partitioning of the raw content into subjects may be controlled. For example the parameter labeled: "Subject extraction assist" has associated with it a percentage scale 30 and a sliding button 32 whose position along the percentage scale 30 may be adjusted by a user using a pointing device. The position of the sliding button 32 along the percentage scale 30, controls the granularity of the partitioning of the subjects. If a detailed or comprehensive subject partitioning is required then the sliding button 32 is set closer to 100% on the sliding scale 30. If, however, only a crude or rough partitioning is required, then the sliding button 32 is positioned closer to 0% on the sliding scale 30.

Figure 6:
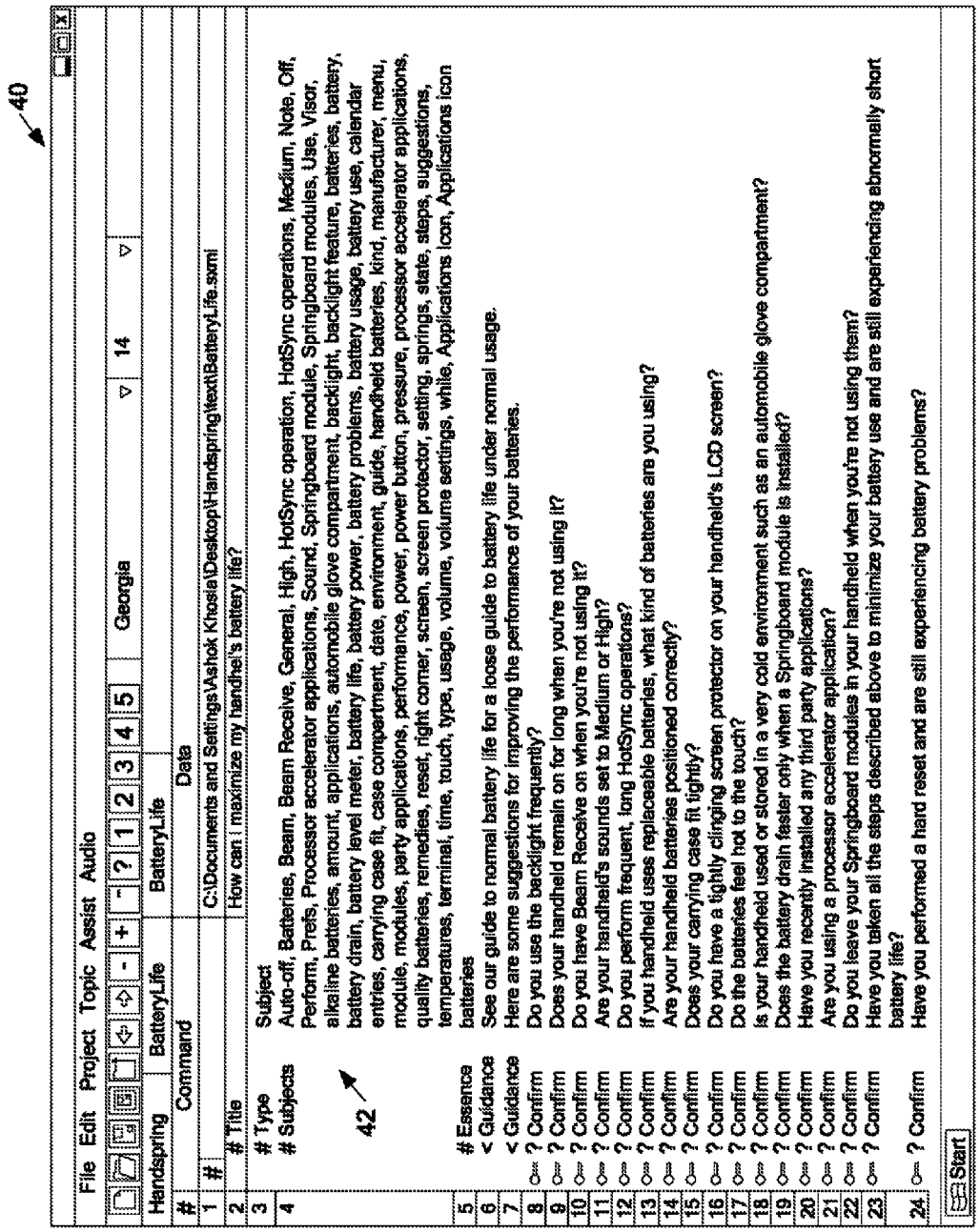
Figure 7:
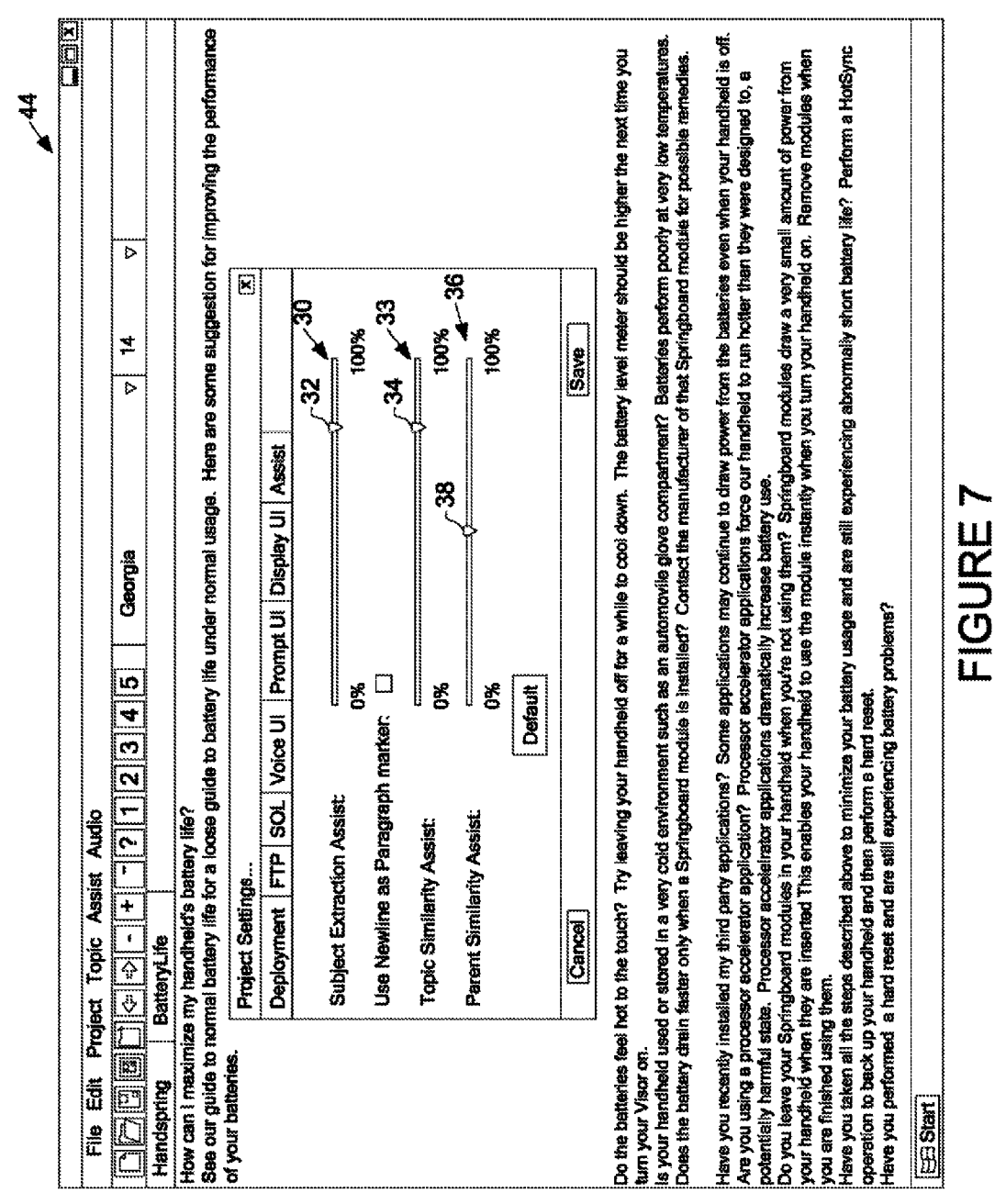
Figure 8:
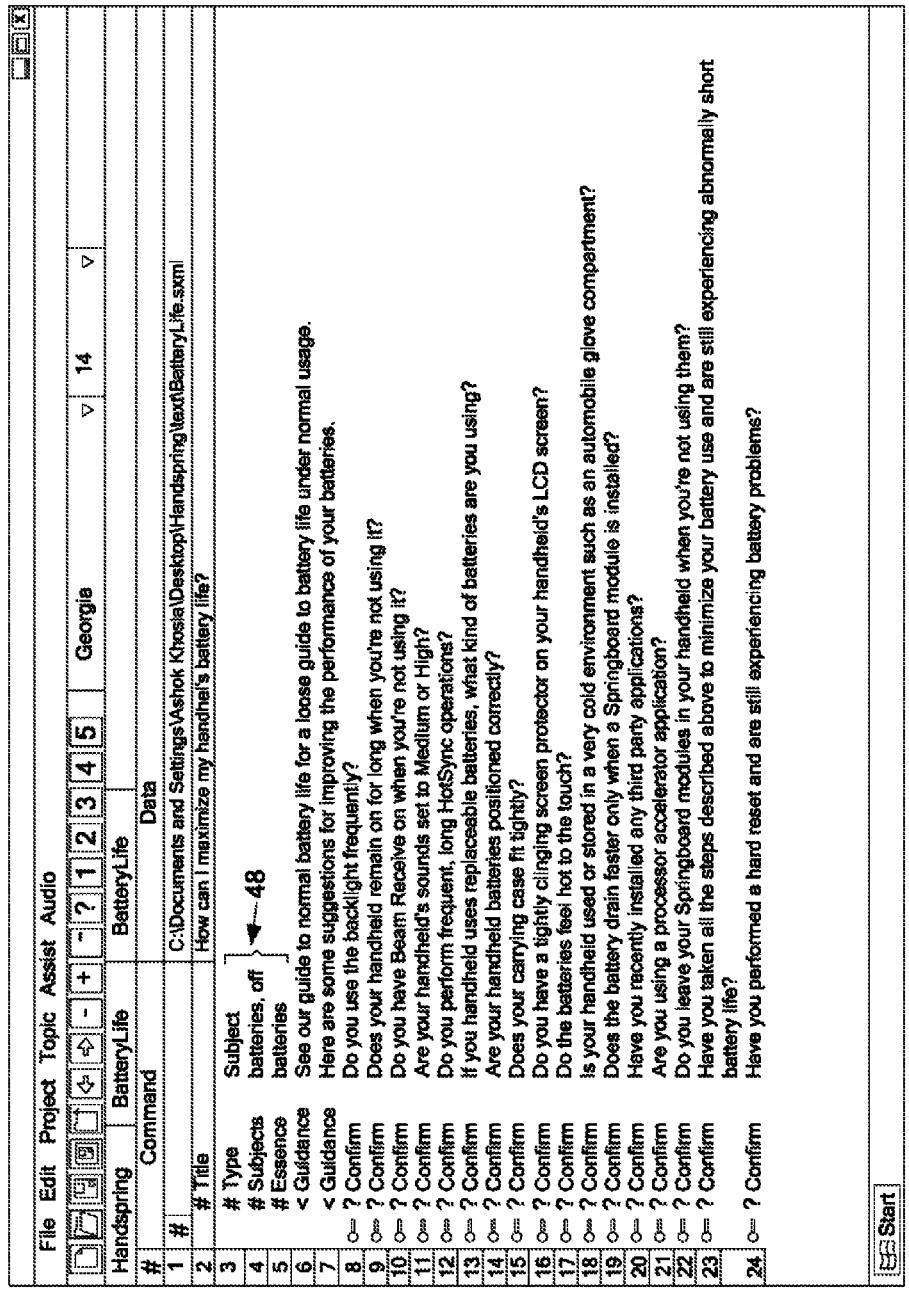
Figure 10:
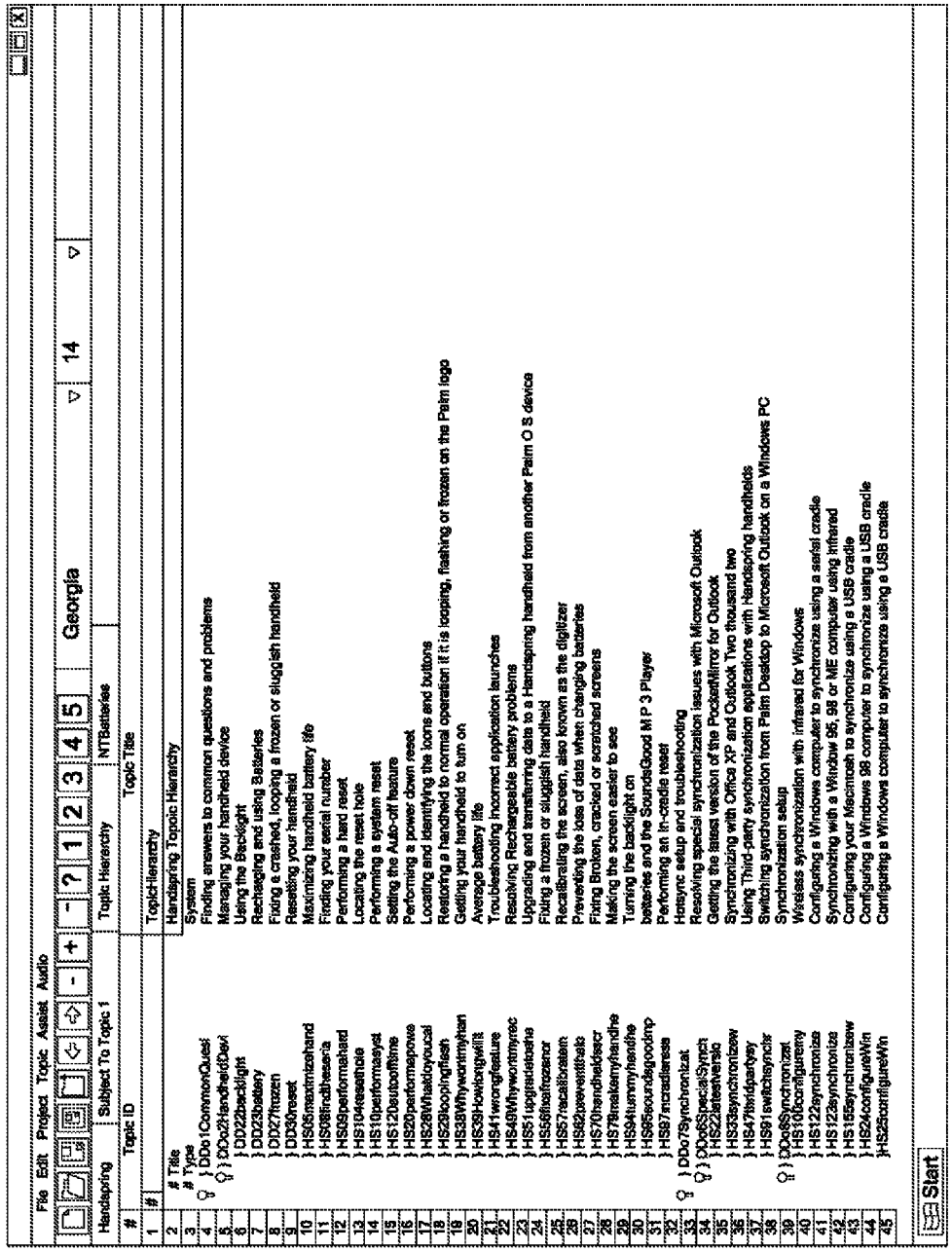
Figure 11:
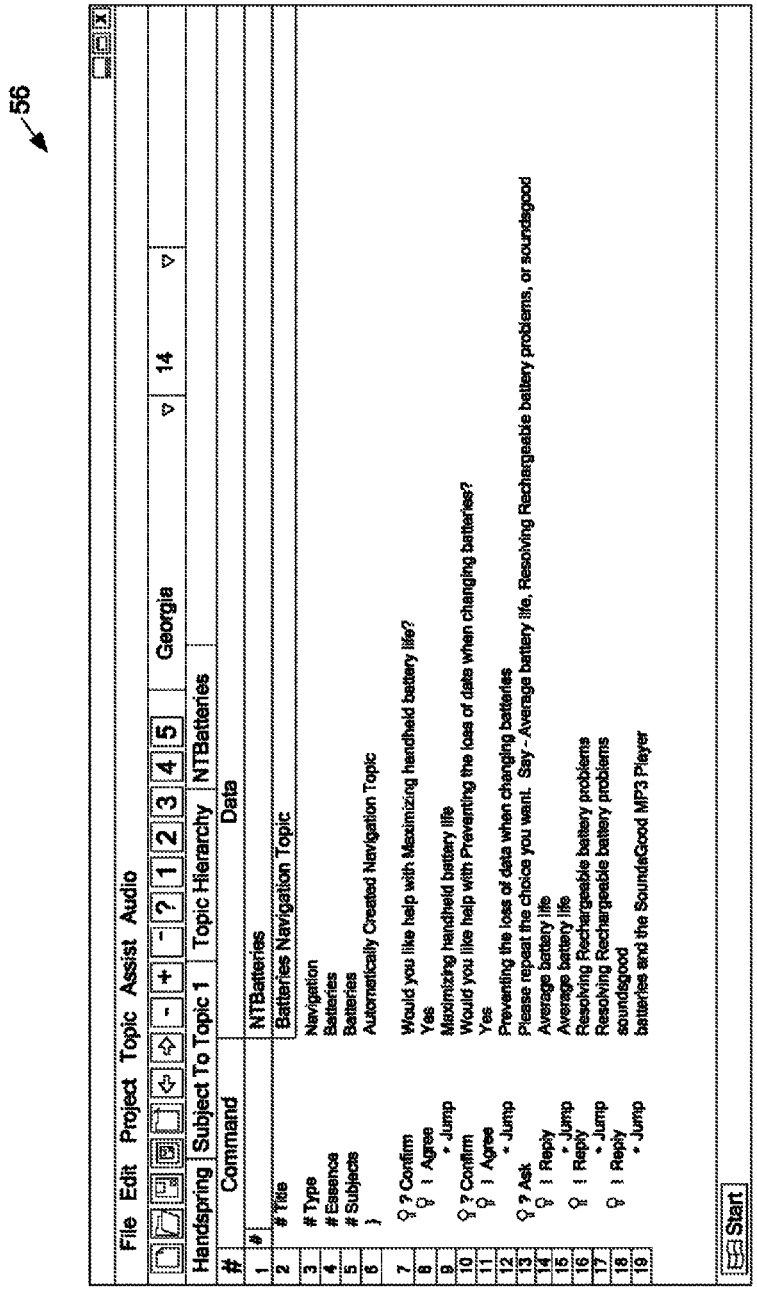

Referring now to FIG. 6 of the drawings, reference numeral 40 shows a view of the graphical user interface wherein a result of a text to topic partitioning of the raw text by the system, in accordance with one embodiment, is illustrated. The subjects generated by the system based on the raw text document are illustrated by reference numeral 42. As will be seen, the sliding button 32 in FIG. 5 of the drawings is set relatively close to 100% on the sliding scale 30. Thus, quite a few subjects were generated. FIG. 7 of the drawings shows a view 44 in which the sliding button 32 has been set to 40% on the sliding scale 30. With the subject extraction assist value set to 40%, only two subjects are generated as illustrated, reference numeral 48 in FIG. 8 of the drawings, which shows a view 46 of the graphical user interface.

Referring again to FIG. 5 of the drawings, it will be seen that the pop-up window 28 has two additional sliding scales indicated by reference numerals 33 and 36, respectively. The sliding scale 33 has a sliding button 34 which is for setting a parameter called "topic similarity" which is used to set the degree of similarity for disambiguating the content (or topic) associated with each subject generated by the system. The "topic similarity" parameter determines how to group topics that are similar for disambiguation. For example for the topic "Windows setup," the "topic similarity" parameter determines how many subtopics such as "Windows 98", "Windows 2000", etc. the system generates. The sliding scale 36 has a sliding button 38 which may be positioned along the sliding scale 36 in order to control a parameter known as "parent similarity" which is used to control the degree of similarity between topic groups or clusters.

Referring again to FIGS. 6 and 8 of the drawings, it will be seen that in addition to generating topics from a text document, selection of the text to topic button also causes the system to tag components of the text document based on semantic meaning. For example, an as can be seen in the view 46 of FIG. 8, all questions in the text document have been tagged with a "confirm" tag. A complete listing of all possible tags that may be used to tag the text is described in co-pending U.S. patent application Ser. No. 10/319,144.

In one embodiment, the graphical user interface also provides a "guide me topic generation button" which when selected causes the system to analyze a text document and to generate guide me topics which asks a caller a question to help locate a topic of interest to the caller, within a body of knowledge. This is particularly useful in cases where the body of knowledge is substantial. When the guide me generation topic button is selected, the system responds by building broad groupings of topics and then generating a clarifying "ask" tag with appropriate "reply" tag and "jumps" to the individual topics.

Figure 9:
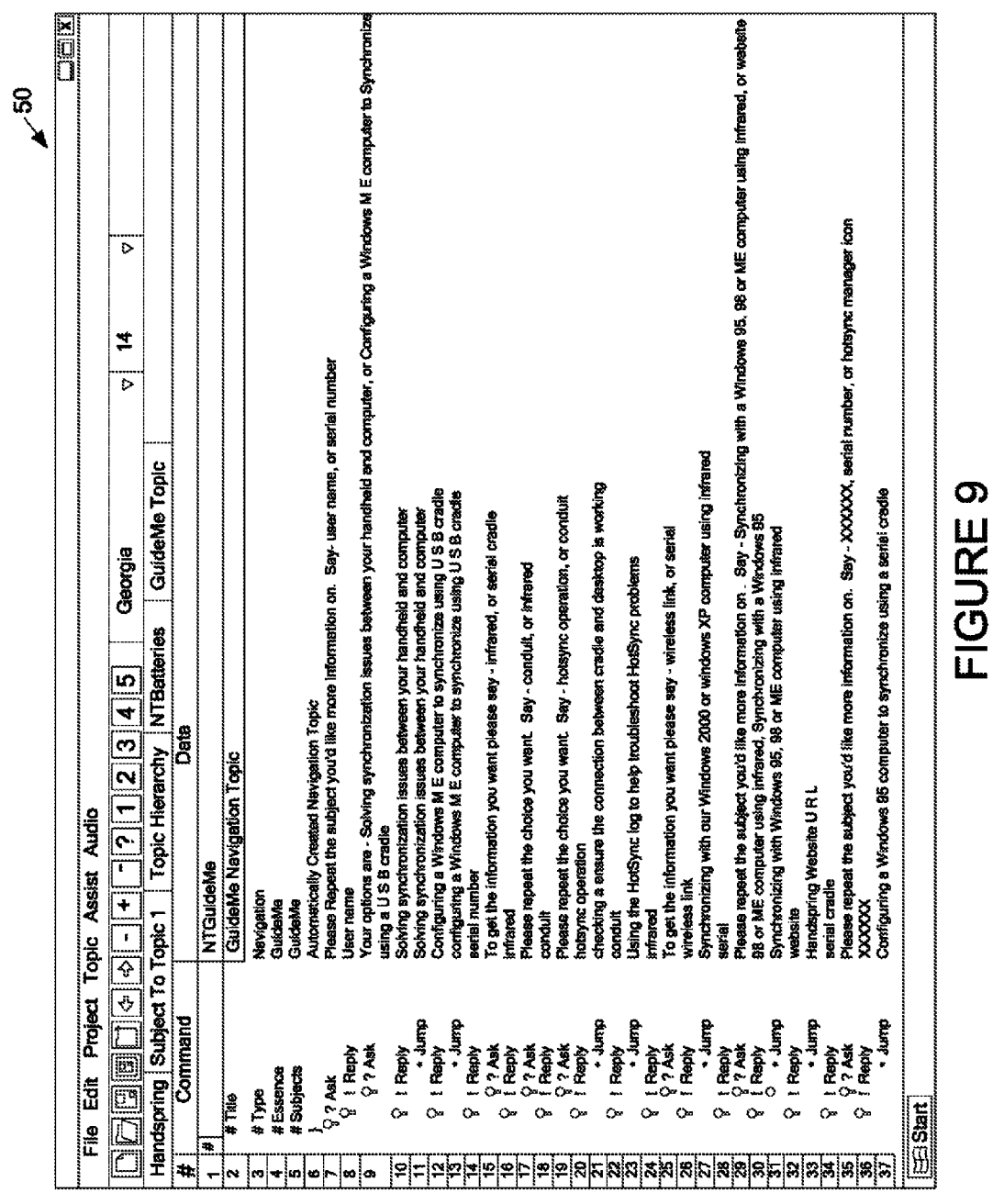

In one embodiment, selection of the guide me topic generation button displays a pop-up window similar to the window 28 which provides the subject extraction, topic similarity, and parent similarity assist features to control the granularity of the groupings of topics used to create the guide me navigation topics. FIG. 9 of the drawings shows a view 50 of the graphical user interface, wherein the guide me navigation topics generated for a voice application are shown.

In contrast to guide me navigation topics, which provide questions which assist the caller to identify a subject topic of interest, the system also provides a number of navigation prompts or questions which are used to disambiguate topics that the system has identified as being relevant to input from the caller. For example, as is shown in the view 54 of FIG. 10 of the drawings, if a user's questions relate to the topic batteries, several topics will be relevant. In the example shown, the topics "maximizing hand held battery life," "average battery life," "resolving rechargeable battery problems," "preventing the life of data when changing batteries," and "batteries and the SoundsGood MP3 player," may all be relevant. Thus, a disambiguating question is necessary in order isolate the topic that should be played. Accordingly, in one embodiment, the graphical user interface provides a "subject to topic" button which when selected by the user causes the system to automatically identify subject topics that are ambiguous and to generate disambiguating questions for these subject topics. For example, in FIG. 11 of the drawings reference numeral 56 illustrates a view of the graphical user interface which shows the particular disambiguating questions that have been generated for the subject topics identified as being ambiguous in FIG. 10 of the drawings.

In order to handle for all possible responses to a prompt by a user the responses have to be anticipated and a corresponding grammar built up. For example, in response to a question or prompt an answer that relates to the topic "adjusting the memory for an Apple Macintosh computer" may conceivably have the following variations:

adjusting Apple Mac memory;
adjusting Apple Macintosh memory;
adjusting Mac memory,
adjusting Macintosh memory;
adjusting an Apple Mac memory;
adjusting Apple Macintosh memory;
Mac memory; and
Macintosh memory.

Thus, a robust voice application would require a comprehensive grammar including all of the above possible variations.

Figure 12:
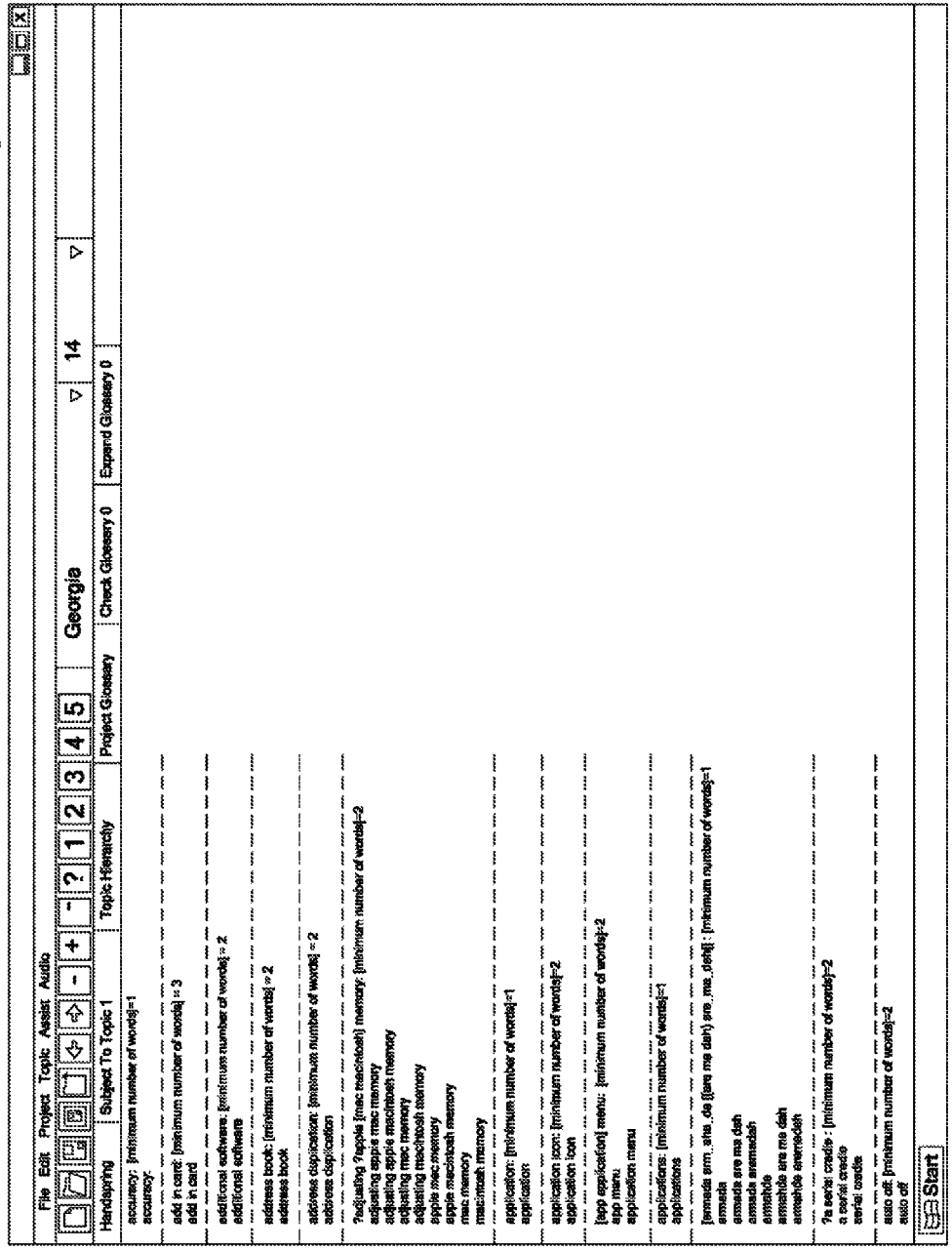

In one embodiment, the graphical user interface of the present invention provides a view 58 shown in FIG. 12 of the drawings, in which the grammar which the system is able to handle is displayed. In a particular embodiment, a shorthand visual notation is used to represent all possible spoken options for a subject or reply in a compact manner. This visual notation is illustrated in Table 60 which is shown in FIG. 13 of the drawings. As will be seen from Table 60, a word that is required to be spoken is depicted in bold type whereas a word that is merely optional is depicted in italic type. Further, underlining is used to depict the "and" operation and in order to represent the "or" operation a comma is used together with parentheses.

In the example shown in Table 60, a "?" is referred to as the optional operator. This is used to designate a word that is optional, i.e., a word that may or may not be spoken by a caller. Further, parentheses are used to represent the "and" operator. Words within parentheses must be spoken together. Thus, in the example of Table 60, parentheses are used to indicate that the words "stop" and "go" must be spoken together. The square brackets denotes the "or" operator which indicates that any of the words within the square brackets may be spoken. In the example of Table 60, the words "and go" or "now" must be spoken.

Figure 14:
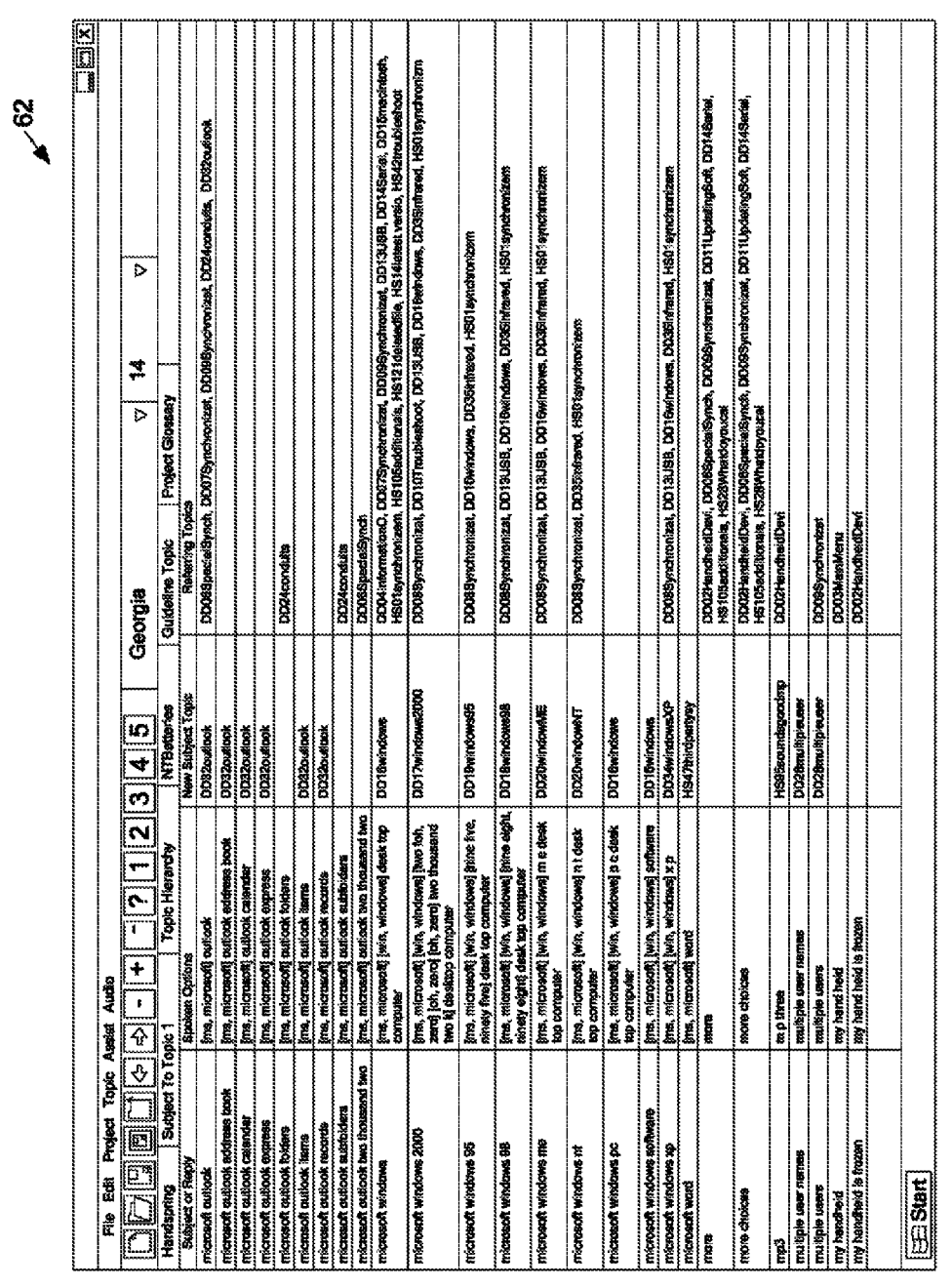

Referring to FIG. 14 of the drawings, a view 62 shown of the graphical user interface is shown wherein the compact or shorthand notation described above with reference to Table 60 is used to display the grammar associated with spoken options for a subject or reply.

Figure 15:
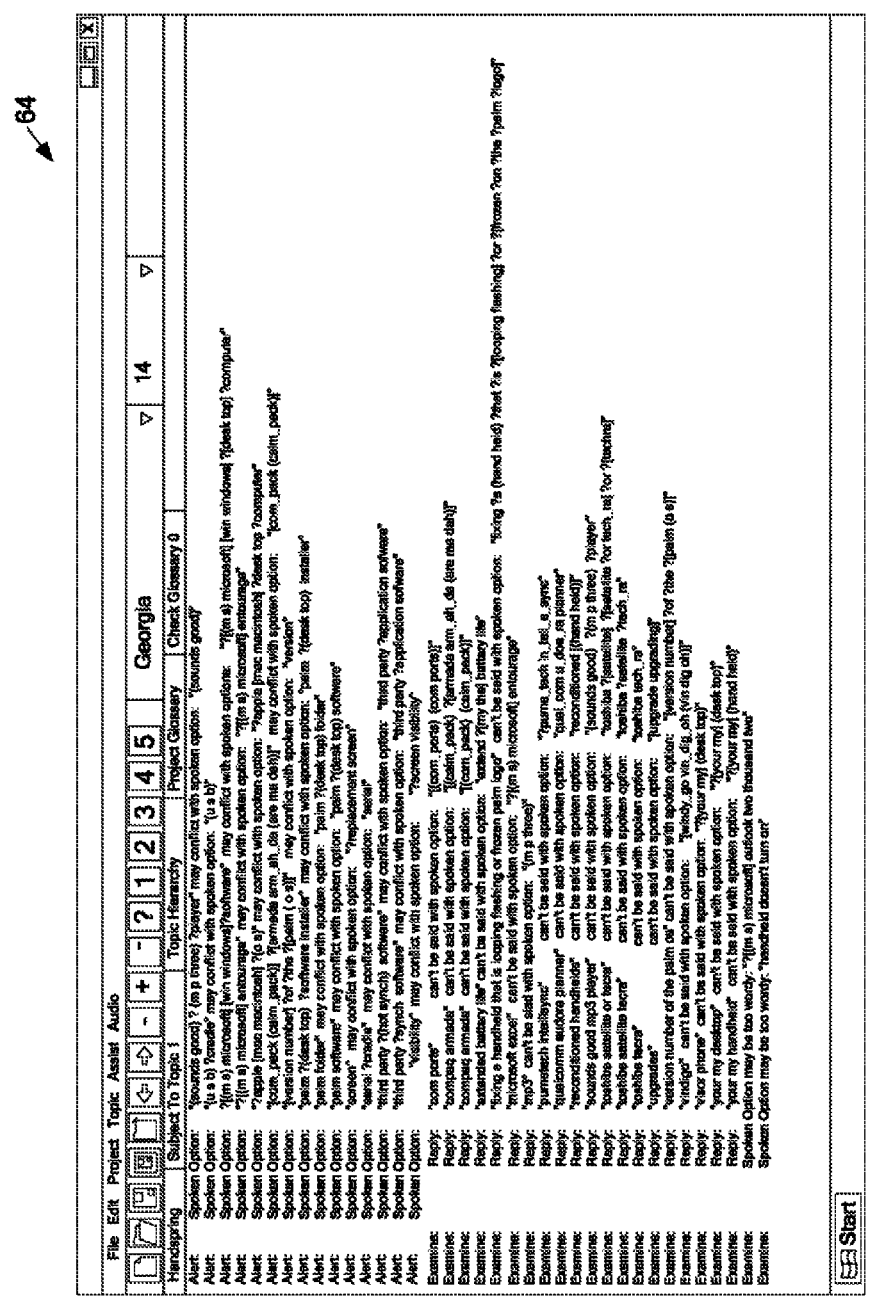

In some embodiments, the graphical user interface may also include a "review grammar button" which when selected causes the system to review the grammar for errors. FIG. 15 shows a view 64 of the graphical user wherein a result of a review operation by the system is shown. As will be seen, the review grammar operation provides three types of messages viz. an alert message, an examine message and an error message. The alert message provides an indication that conflicts exist between available subjects and responses, for example, when the same spoken object corresponds to two different topics, as is the case in the example of Table 66 (see FIG. 16). Table 66 shows the grammar associated with two subjects, viz. "windows" and "desktop computer" which point, respectively to "STWindows" and "STDesktop." As will be seen, the spoken option "windows desktop computer" prompts to both STWindows and STDesktop. Thus, in response to a selection of the review grammar button, the system would analyze the grammar and display an alert message to indicate or flag the conflict.

The examined message indicates cases where a subject cannot be spoken using the defined spoken options. For instance, the grammar may include the entries "Apple [mac macintosh]" with the spoken options: "apple Mac" and "apple macintosh." If, however, the subject is "macintosh," it will be seen that this subject cannot be selected with the spoken options.

Error messages are used to indicate an illegal spoken option. For example, the grammar "six sixth(? the ? number six]" will indicate an error message since the close parenthesis character is missing. Another example where an error message would be generated includes the case in which all words in the grammar are flagged with a question mark ? character which indicates that they are optional. Since a user has to utter at least one word, the error message indicates to the user that at least one of the words in the grammar should be made mandatory.

The graphical user interface also provides a "review prompt style button" which when selected causes the system to analyze each prompt to ensure that it is written in a manner to elicit a crisp or precise response from a caller. Each prompt is also analyzed to make sure that it is easily understood by a caller and does not contain words that are ambiguous, or sentences that are too lengthy, etc. The details of how the system reviews the prompts are described in co-pending U.S. patent application Ser. No. 10/319,144.

FIG. 17(*a*) shows a view 68 of the graphical user interface wherein a result of the prompt style review operation is shown. As will be seen, the system is recommending in pop-up window 70 that the word "usage" in the prompt be replaced with the word "use" to make the prompt more easily understood by the caller. Another example of a result of the prompt style review operation is shown in FIG. 17(*b*) of the drawings, wherein it will be seen that the system is prompting the user to replace the word "perform" in the prompt with the word "due" or some other commanding word construction.

Figure 18:
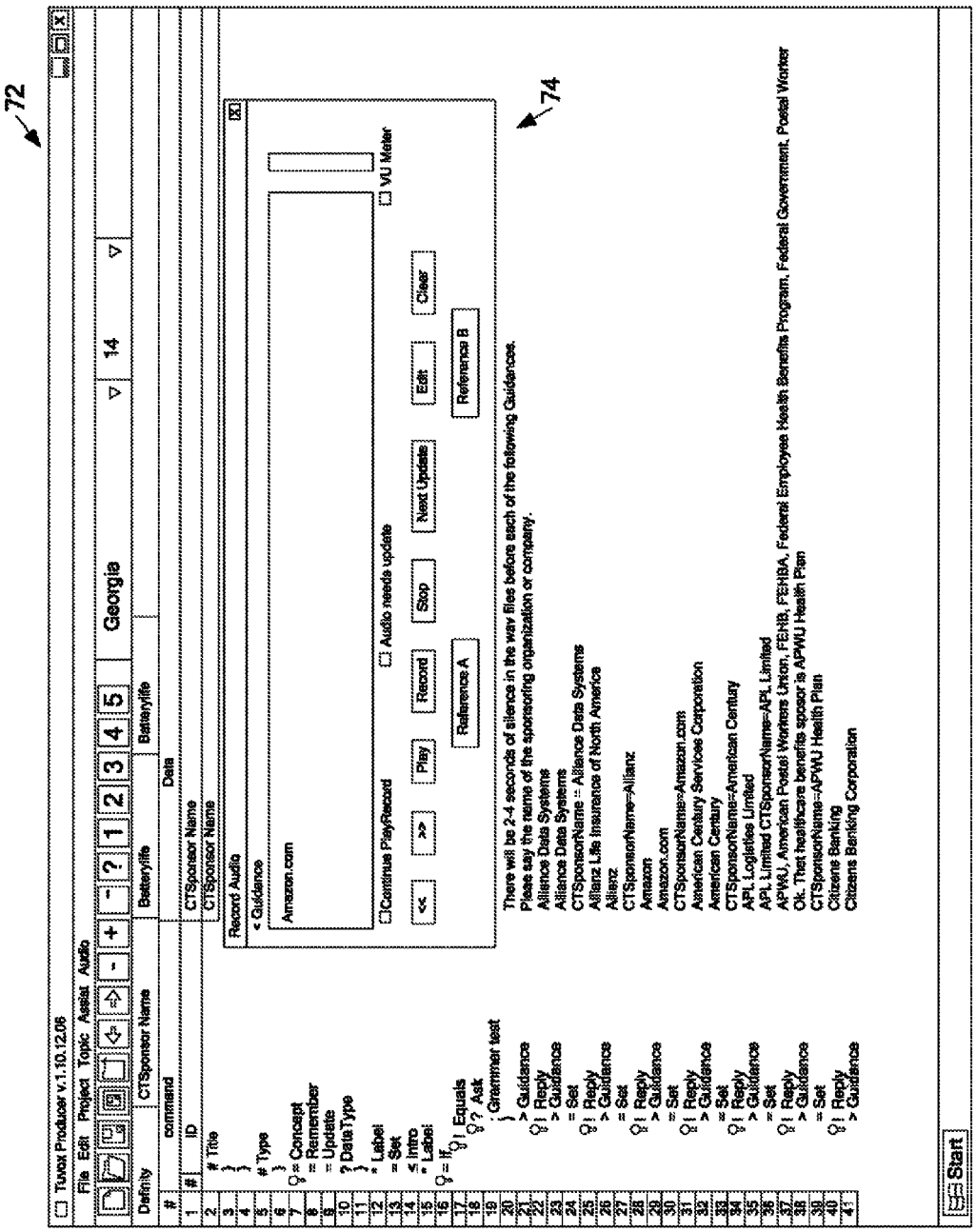

Once all prompts have been written, it is necessary to record audio so that the system can playback the prompts to a caller. Accordingly, the graphical user interface provides a "record audio button" which may be selected to cause the system to go into an audio receive mode wherein the system records audio from an audio source such as an external microphone. After recording, the system automatically saves the recorded audio and then builds an internal association between the recorded audio and its associated prompt. FIG. 18 of the drawings shows a view 72 of the graphical user interface wherein a record audio pop-up window 74 is displayed. The pop-up window 74 provides functionality to allow a user to record audio for a particular prompt. In one embodiment of the graphical user interface, a visual indication is provided to indicate prompts for which no audio has been recorded. In one embodiment, the visual indication may take the form of a different color font used to represent prompts for which no audio has been recorded. In another embodiment, if a change is made to a prompt for which an audio message has already been recorded, then the system automatically changes the visual indicator associated with the prompt to indicate that the audio is "dirty" in the sense that it has to be re-recorded to conform to the changed prompt.

Figure 19:
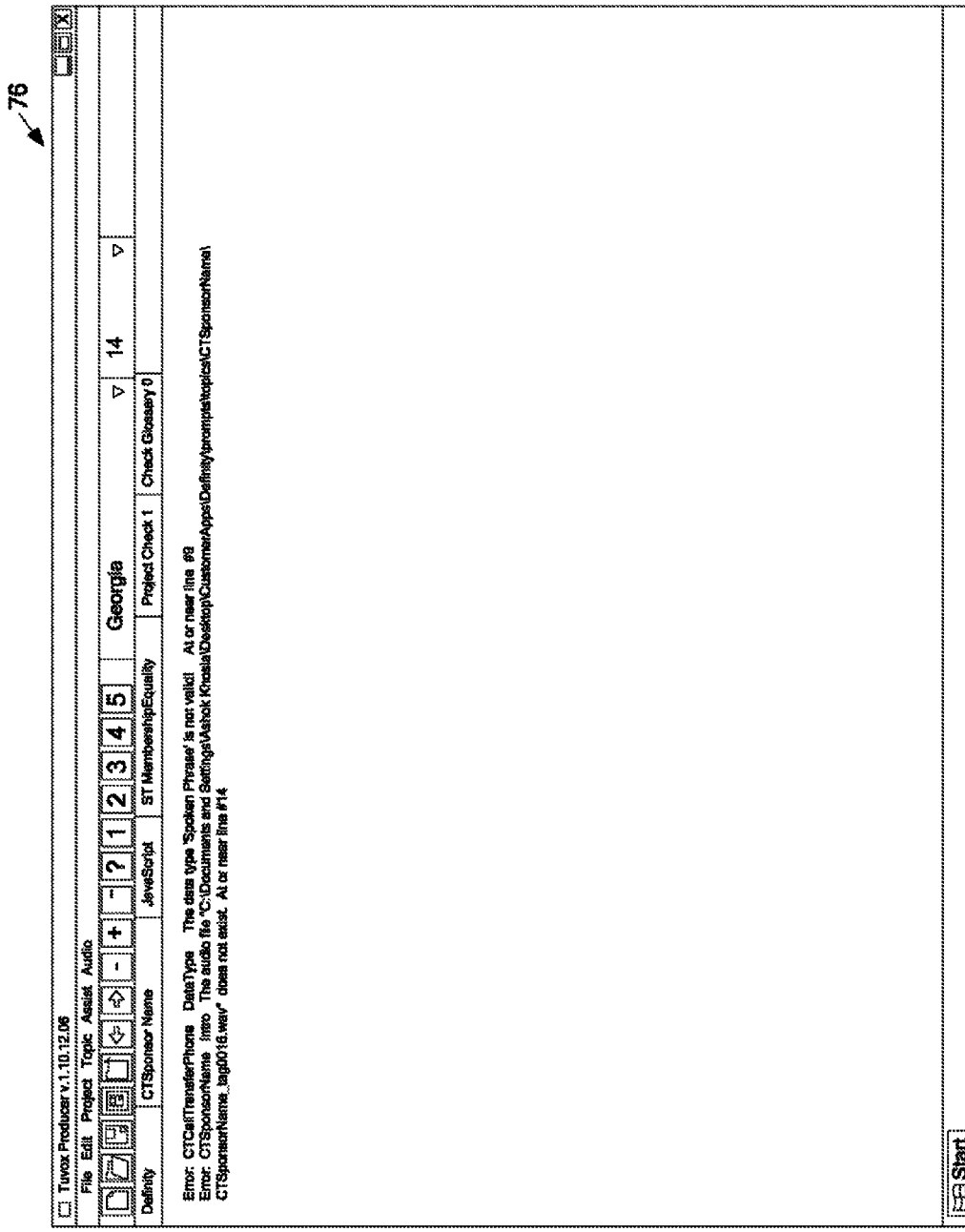

In one embodiment, the graphical user interface further comprises a "verify project" button which when selected causes the system to review the entire project for errors. For example, FIG. 19 shows a view 76 of the graphical user interface wherein a result of a review of the project by the system in response to selection of the verify project button is displayed.

Figure 20:
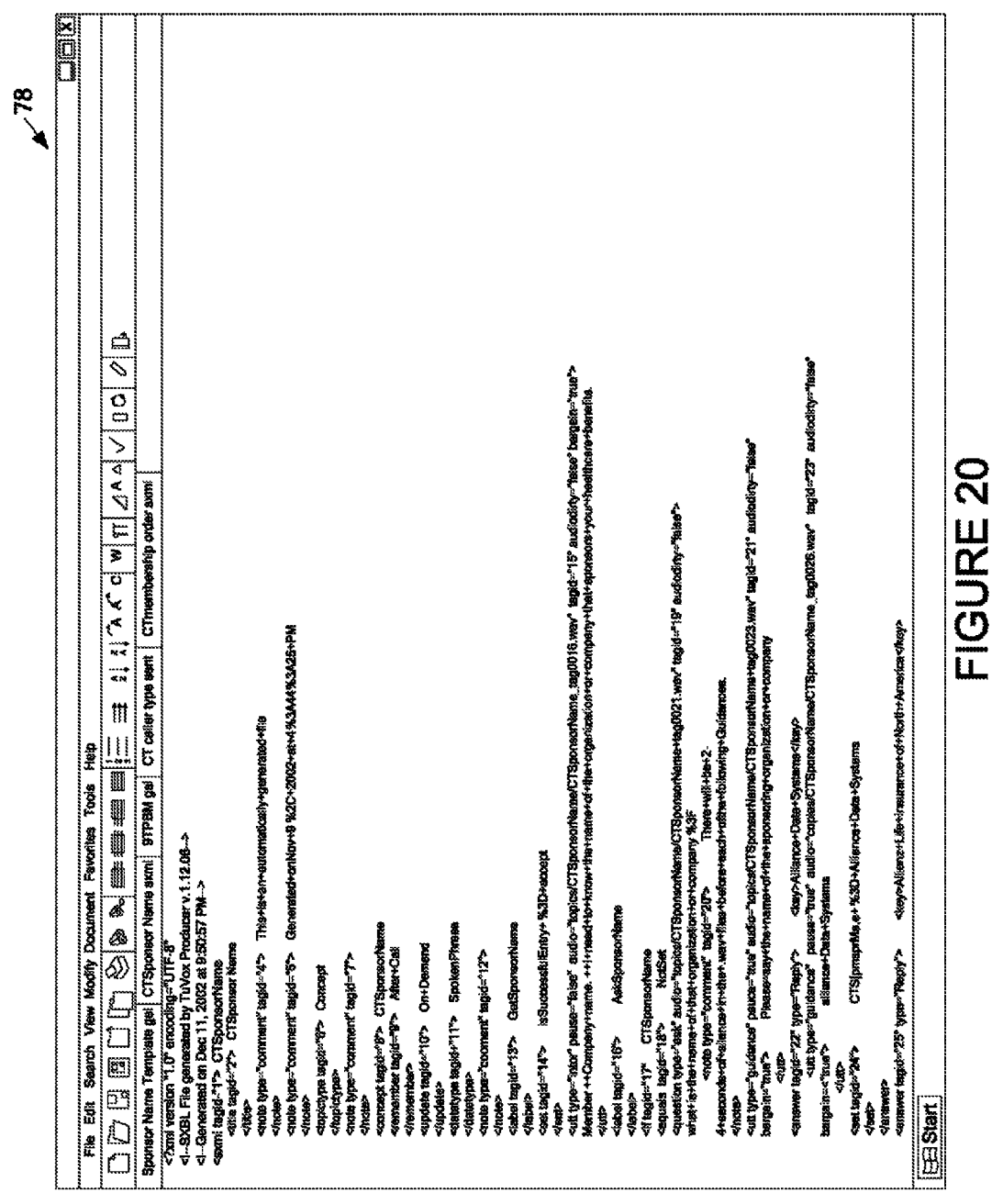

The graphical user interface of the present invention may, in some embodiments, provide a view 78, shown in FIG. 20 of the drawings, wherein the actual markup language code associated with the voice application is displayed. In one example, the code may be SXML code as described in co-pending U.S. patent application Ser. No. 10/319,144.

In one embodiment, the graphical user interface provides an editor to allow a user to enter code to define a function that is called from within the markup language code. For example, in one embodiment, the graphical user interface provides a Java Script editor which is shown in the view 80 shown in FIG. 21 of the drawings. The editor allows the user to enter Java Script directly into the system which then links the Java Script to a function call in the markup language code.

Figure 22:
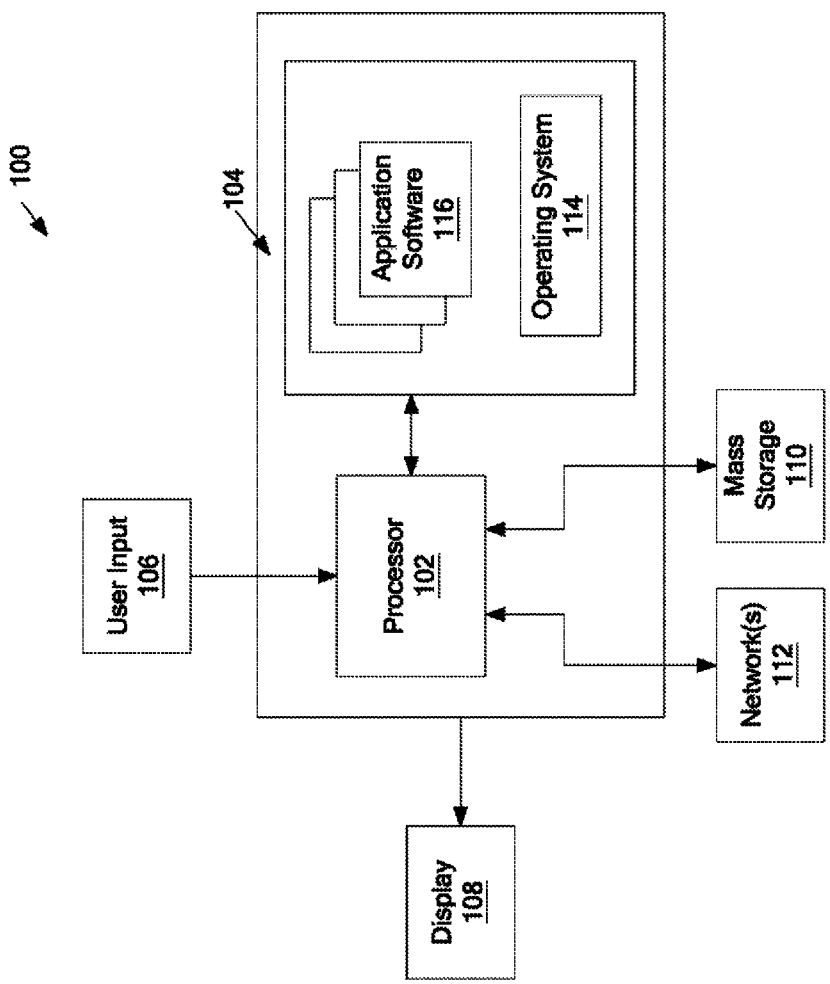
FIG. 22 shows a high-level block diagram of a computer that may be used to implement the methods of the present invention.

Referring now to FIG. 22 of the drawings, reference numeral 100 generally indicates an example of a processing system that may represent a general purpose computer that may be used to implement the system described above and to perform the various techniques described above.

Processing system 100 typically includes at least one processor 102 coupled to a memory 104. Processor 102 may represent one or more processors (e.g. microprocessors), and memory 104 may represent random access memory (RAM) devices comprising a main storage of system 100, as well as any supplemental levels of memory e.g., cache memories, non-volatile or back-up memories (e.g. programmable or flash memories), read-only memories, etc. In addition, memory 104 may be considered to include memory storage physically located elsewhere in system 100, e.g. any cache memory in a processor 102, as well as any storage capacity used as a virtual memory, e.g., as stored on a mass storage device 110 or on another computer coupled to system 100 via network 112.

Processing system 100 also typically receives a number of inputs and outputs for communicating information externally. For interface with a user or operator, system 100 typically includes one or more user input devices 106 (e.g., a keyboard, a mouse, etc.) and a display 108 (e.g., a CRT monitor, a LCD panel). However, with some implementations of system 100, such as in a server, direct local user input and output may not be required, such that user input devices 106 and display 108 may be omitted.

For additional storage, system 100 may also include one or more mass storage devices 110, e.g., a floppy or other removable disk drive, a hard disk drive, a Direct Access Storage Device (DASD), an optical drive (e.g. a CD drive, a DVD drive, etc.) and/or a tape drive, among others. Furthermore, hardware 100 may include an interface with one or more networks 112 (e.g., a land, a WAN, a wireless network, and/or the Internet among others) to permit the communication of information with other computers coupled to the networks. It should be appreciated that system 100 typically includes suitable analog and/or digital interfaces between processor 102 and each of the components 104, 106, 108 and 112 as is well known in the art.

Processing system 100 operates under the control of an operating system 114, and executes various computer software applications, components, programs, objects, modules, etc. (e.g. a program or module which performs operations as shown in FIGS. 1, 2, and 3 of the drawings). Moreover, various applications, components, programs, objects, etc. may also execute on one or more processors in another computer coupled to system 100 via a network 112, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs". The computer programs typically comprise one or more instructions set at various times in various memory and storage devices in a computer, and that, when read and executed by one or more processors in a computer, cause the computer to perform these steps necessary to execute steps or elements involving the various aspects of the invention. Moreover, while the invention has been described in the context of fully functioning computers and computer systems, those skilled in the art will appreciate that the various embodiments of the invention are capable of being distributed as a program product in a variety of form, and that the invention applies equally regardless of the particular type of signal bearing media used to actually off the distribution. Examples of signal bearing media include but are not limited to recordable type media such as volatile and non-volatile memory devices, floppy and other removable disks, hard disk drives, optical disks (e.g. CD ROMS, DVDs, etc.), among others, and transmission type media such as digital and analog communication links.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

The invention claimed is:

1. A non-transitory computer readable medium having stored thereon a sequence of instructions which when executed by a computer, causes the computer to perform a method comprising:
   generating a first graphical user interface comprising a text to topic button;
   receiving an input selecting the text to topic button; and
   generating a second graphical user interface comprising a plurality of percentage scales simultaneously displayed, each having an associated user-adjustable sliding button wherein a first percentage scale of the plurality of percentage scales controls a number of subjects that a text file is partitioned into and a second percentage scale of the plurality of percentage scales controls a number of subtopics of the number of subjects.

2. The non-transitory computer readable medium of claim 1, wherein partitioning the second graphical user interface comprises three percentage scales.

3. The non-transitory computer readable medium of claim 1 comprising receiving another input identifying a location of the text file.

4. The non-transitory computer readable medium of claim 1 comprising partitioning the text file into subjects in response to receiving the input.

5. The non-transitory computer readable medium of claim 2, wherein one percentage scale is to control a degree similarity between subject topics generated by said partitioning.

6. The non-transitory computer readable medium of claim 2, wherein one percentage scale is to control a number of subject topics generated by said partitioning for purposes of disambiguation between topics.

7. A method for a computer to generate content for a speech application, the method comprising:
   generating a first graphical user interface comprising a text to topic button;
   receiving an input selecting the text to topic button; and
   generating a second graphical user interface comprising a plurality of percentage scales displayed simultaneously, each having an associated user-adjustable sliding button wherein a first percentage scale of the plurality of percentage scales controls a number of subjects that a text file is partitioned into and a second percentage scale of the plurality of percentage scales controls a number of subtopics of the number of subjects.

8. The method of claim 7, wherein the second graphical user interface comprises three percentage scales.

9. The method of claim 8, wherein one percentage scale is to control a granularity of subject topics generated by said portioning.

10. The method of claim 8, wherein one percentage scale is to control a degree similarity between subject topics generated by said portioning.

11. The method of claim 8, wherein one percentage scale is to control a number of subject topics generated by said portioning for purposes of disambiguation between topics.

12. The method of claim 7, wherein generating content for speech application comprises receiving another input identifying a location of the text file.

13. The method of claim 7, wherein generating content for speech application comprises partitioning the text file into subjects in response to receiving the input.

14. A system, comprising:
a processor; and
a memory coupled to the processor, the memory storing instructions which when executed by the processor cause the system to:
generate a first graphical user interface comprising a text to topic button;
receive an input selecting the text to topic button; and
generate a second graphical user interface comprising a plurality of percentage scales displayed simultaneously, each having an associated user-adjustable sliding button wherein a first percentage scale of the plurality of percentage scales controls a number of subjects that a text file is partitioned into and a second percentage scale of the plurality of percentage scales controls a number of subtopics of the number of subjects.

15. The system of claim 14, wherein the memory storing instructions which when executed by the processor cause the system to receive another input identifying a location of the text file.

16. The system of claim 14, wherein the memory storing instructions which when executed by the processor cause the system to partition the text file into subjects in response to receiving the input and storing information on the partitioning.

17. The system of claim 14, wherein the second graphical user interface comprises three percentage scales.

18. The system of claim 17, wherein one percentage scale is to control at least one of:
a granularity of subject topics generated by said portioning
a degree similarity between subject topics generated by said portioning.

19. The system of claim 17, wherein one percentage scale is to control a number of subject topics generated by said portioning for purposes of disambiguation between topics.

* * * * *